United States Patent
Katayama et al.

(10) Patent No.: US 12,508,953 B2
(45) Date of Patent: Dec. 30, 2025

(54) SEAT CONTROL DEVICE AND SEAT CONTROL METHOD

(71) Applicants: Yota Katayama, Aichi (JP); Koji Ozawa, Aichi (JP); Hidekazu Imai, Aichi (JP)

(72) Inventors: Yota Katayama, Aichi (JP); Koji Ozawa, Aichi (JP); Hidekazu Imai, Aichi (JP)

(73) Assignee: NIDEC MOBILITY CORPORATION, Aichi (JP)

( * ) Notice: Subject to any disclaimer, the term of this patent is extended or adjusted under 35 U.S.C. 154(b) by 116 days.

(21) Appl. No.: 18/153,317

(22) Filed: Jan. 11, 2023

(65) Prior Publication Data

US 2023/0219463 A1 Jul. 13, 2023

(30) Foreign Application Priority Data

Jan. 12, 2022 (JP) ................................. 2022-003052

(51) Int. Cl.
*B60N 2/02* (2006.01)
*B60N 2/06* (2006.01)
*B60N 2/22* (2006.01)

(52) U.S. Cl.
CPC ....... *B60N 2/02246* (2023.08); *B60N 2/0244* (2013.01); *B60N 2/06* (2013.01);
(Continued)

(58) Field of Classification Search
CPC ........ B60N 2/02246; B60N 2/06; B60N 2/22; B60N 2/0272
See application file for complete search history.

(56) References Cited

U.S. PATENT DOCUMENTS

| | | | |
|---|---|---|---|
| 2004/0140783 A1* | 7/2004 | Fukuhara | B60N 2/0244 318/467 |
| 2007/0106429 A1 | 5/2007 | Endo et al. | |

(Continued)

FOREIGN PATENT DOCUMENTS

| | | |
|---|---|---|
| CN | 109278594 A | 1/2019 |
| JP | 2004210159 A | 7/2004 |

(Continued)

OTHER PUBLICATIONS

Office Action in JP Application No. 2022-003052, mailed Oct. 28, 2025. 6pp.

*Primary Examiner* — Adam M Queler
(74) *Attorney, Agent, or Firm* — HAUPTMAN HAM, LLP (57) ABSTRACT

A seat control device is configured to control an operation of an electric seat including a seat portion and a backrest portion. The seat control device includes: a first control unit configured to control an operation of the seat portion; a second control unit configured to control an operation of the backrest portion; and a pinching detection unit. In a case in which the pinching detection unit detects pinching during operations of both the seat portion and the backrest portion, the first control unit performs control to bring the seat portion into a pinching-free state in accordance with a direction of the operation of the seat portion before the pinching occurs, and the second control unit performs control to bring the backrest portion into a pinching-free state in accordance with a direction of the operation of the backrest portion before the pinching occurs.

7 Claims, 11 Drawing Sheets

(52) U.S. Cl.
CPC .............. *B60N 2/22* (2013.01); *B60N 2/0272* (2023.08); *B60N 2220/10* (2023.08); *B60N 2220/20* (2023.08)

(56) References Cited

U.S. PATENT DOCUMENTS

| | | | |
|---|---|---|---|
| 2017/0174102 A1* | 6/2017 | Lee | ..................... B60N 2/0228 |
| 2022/0134909 A1* | 5/2022 | Han | ....................... B60R 16/03 |
| | | | 701/49 |

FOREIGN PATENT DOCUMENTS

| | | | | |
|---|---|---|---|---|
| JP | 2007131138 A | 5/2007 | | |
| JP | 2010-111178 A | 5/2010 | | |
| JP | 2016129449 A | 7/2016 | | |
| KR | 1020130039104 A | 4/2013 | | |
| KR | 20200065302 A | * | 6/2020 | ......... B60N 2/02246 |
| KR | 1020200065302 A | 6/2020 | | |
| KR | 1020200065312 A | 6/2020 | | |

* cited by examiner

| OPERATIONS BEFORE PINCHING IS DETECTED | | OPERATIONS AFTER PINCHING IS DETECTED | | |
| --- | --- | --- | --- | --- |
| SEAT PORTION | BACKREST PORTION | SEAT PORTION | BACKREST PORTION | |
| STOPPED | FORWARD | — | — | ⋯ (1) |
| | BACKWARD | STOPPED | FORWARD | ⋯ (2) |
| | STOPPED | — | — | ⋯ (3) |
| FORWARD | FORWARD | — | — | ⋯ (4) |
| | BACKWARD | STOPPED | FORWARD | ⋯ (5) |
| | STOPPED | — | — | ⋯ (6) |
| BACKWARD | FORWARD | FORWARD | STOPPED | ⋯ (7) |
| | BACKWARD | FORWARD | FORWARD | ⋯ (8) |
| | STOPPED | FORWARD | STOPPED | ⋯ (9) |

| OPERATIONS BEFORE PINCHING IS DETECTED | | OPERATIONS AFTER PINCHING IS DETECTED | | |
|---|---|---|---|---|
| SEAT PORTION | BACKREST PORTION | SEAT PORTION | BACKREST PORTION | |
| STOPPED | FORWARD | — | — | ⋯ (1) |
| | BACKWARD | STOPPED | FORWARD | ⋯ (2) |
| | STOPPED | — | — | ⋯ (3) |
| FORWARD | FORWARD | — | — | ⋯ (4) |
| | BACKWARD | FORWARD | FORWARD | ⋯ (5) |
| | STOPPED | — | — | ⋯ (6) |
| BACKWARD | FORWARD | FORWARD | FORWARD | ⋯ (7) |
| | BACKWARD | FORWARD | FORWARD | ⋯ (8) |
| | STOPPED | FORWARD | STOPPED | ⋯ (9) |

SEAT CONTROL DEVICE AND SEAT CONTROL METHOD

CROSS-REFERENCE TO RELATED APPLICATIONS

This application is based upon and claims the benefit of priority from Japanese Patent Application No. 2022-003052, filed on Jan. 12, 2022; the entire contents of which are incorporated herein by reference.

FIELD

One or more embodiments of the present invention relate to a device configured to control an electric seat equipped in a vehicle or the like, and particularly to a seat control device having a function of detecting pinching of foreign object.

BACKGROUND

Some vehicles such as four-wheeled motor vehicles are equipped with an electric seat in which a seat portion and a backrest portion are moved back and forth by rotation of a motor. In such a seat, in a related-art, when adjusting the positions of the seat portion and the backrest portion, the positions are adjusted by operating an operation unit provided near the seat. On the other hand, in recent years, a vehicle is introduced with an automatic driving function of registering the position of the seat portion or backrest portion in advance as a target position in accordance with a user's preference and automatically moving the seat portion and backrest portion to the target position when the user gets in the vehicle.

In a vehicle with such an automatic driving function, for example, in a state in which there is a person or object between the front seat and the rear seat, when the seat portion of the front seat is automatically moved backward (straight forward), it is unsafe that the person or object is pinched between the front seat and the rear seat. The same applies to the case in which the backrest portion of the front seat automatically moves (tilts) backward. Therefore, a seat control device is required to have a function of quickly detecting pinching and reversing the seat portion or the backrest portion in the direction opposite to the movement direction to recover from the pinching.

When pinching occurs, the current flowing through the motor increases and the rotation speed of the motor decreases as the load applied to the motor increases. Therefore, it is possible to determine whether or not pinching has occurred by detecting the amount of change (difference) in the current or rotation speed of the motor in a predetermined period and comparing the detected value with a threshold value. KR10-2020-0065312A, KR10-2020-0065302A, KR10-2013-0039104A, CN109278594A, JP2016-129449A, and JP2007-131138A discloses a pinching detection technique in seat position control. JP2004-210159A describes a control method of a seat position when pinching is detected, which occurs when a seat cushion is flipped up.

FIGS. 10A to 10C and FIGS. 11A to 11C show basic operations in a case in which pinching has occurred by an electric seat 30. The seat 30 includes a seat portion 31 that can move straight in the front-and-rear direction, and a backrest portion 32 that can tilt in the front-and-rear direction. The arrow F indicates the forward direction, and the arrow R indicates the backward direction. Hereinafter, the straight operation of the seat portion 31 in the front-and-rear direction will be referred to as a "sliding operation", and the tilting operation of the backrest portion 32 in the front-and-rear direction will be referred to as a "reclining operation".

Figure 10A:
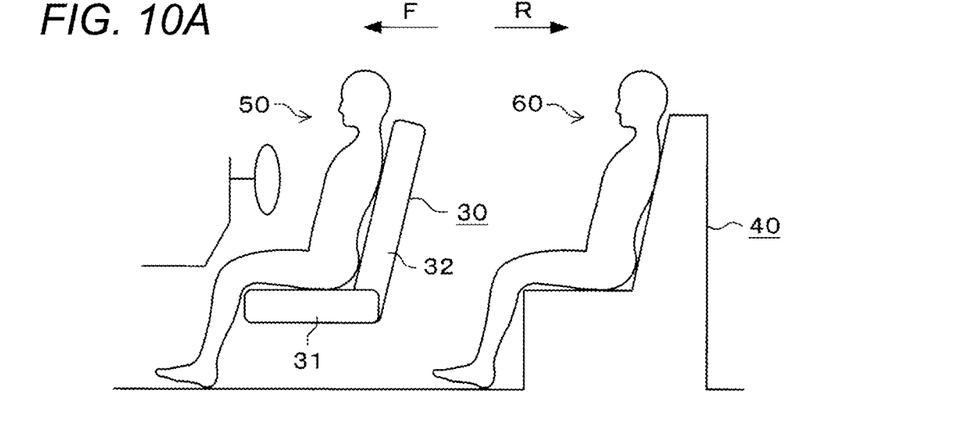
FIGS. 10A to 10C are diagrams for describing pinching due to the movement of the seat portion.
Figure 10B:
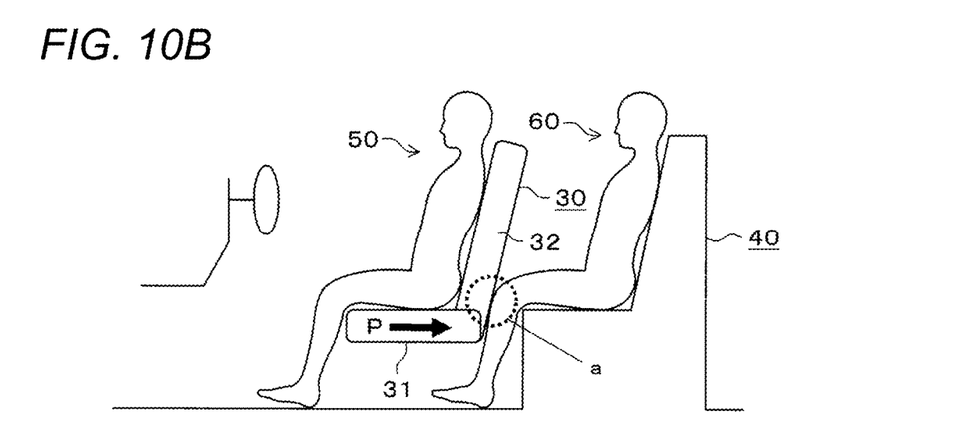
Figure 10C:
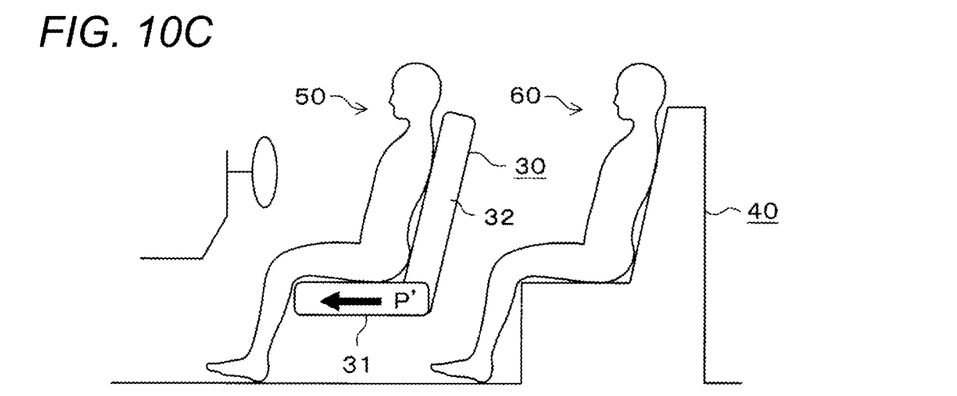

FIGS. 10A to 10C show cases where pinching has occurred during the sliding operation of the seat portion 31. FIG. 10A shows the state before the sliding operation, in which the front seat (here, the driver's seat) 30 on which an occupant 50 is seated is positioned at a certain distance from a rear seat 40 on which an occupant 60 is seated.

In this state, when the occupant 50 performs an automatic operation to automatically move the seat portion 31 to a predetermined position (target position) in the backward direction R, the seat portion 31 moves in the P direction by the sliding operation as shown in FIG. 10B, and the backrest portion 32 also moves in conjunction with the seat portion 31. That is, the entire seat 30 moves in the backward direction R. At this time, if the target position is close to the rear seat 40, a part of the seat 30 that is moving hits the legs of the occupant 60 on the rear seat, as indicated by the dashed line a. As a result, the seat 30 cannot move any further, and the legs are pinched between the seats 30 and 40. When this pinching is detected, the motor temporarily stops at the pinching position in FIG. 10B and then rotates in reverse. Therefore, the seat portion 31 of the seat 30 is reversed from the pinching position and moves in the P' direction opposite to the P direction as shown in FIG. 10C. As a result, the space between the seats 30 and 40 is widened, and the legs of the occupant 60 are recovered from the pinching.

Figure 11A:
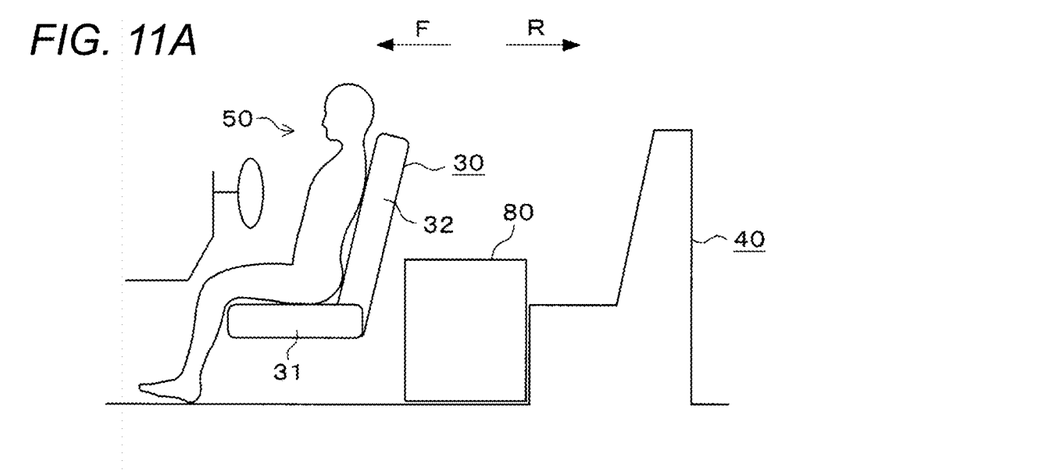
FIGS. 11A to 11C are diagrams for describing pinching due to the movement of the backrest portion.
Figure 11B:
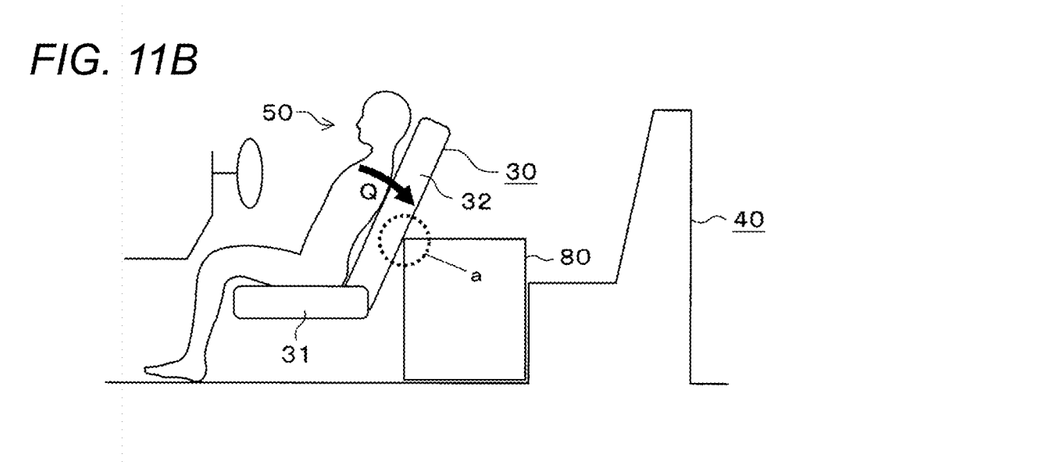
Figure 11C:
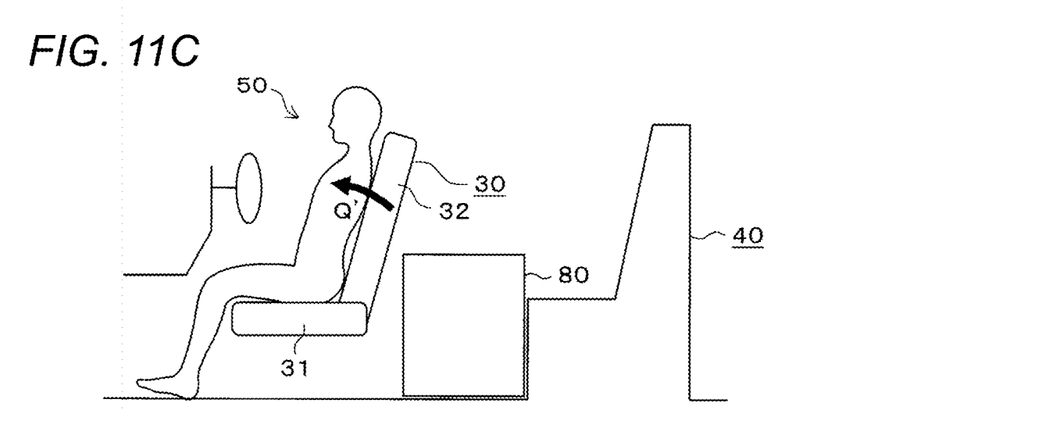

FIGS. 11A to 11C show cases where pinching has occurred during the reclining operation of the backrest portion 32. FIG. 11A shows the state before the reclining operation, in which the front seat 30 on which the occupant 50 is seated is positioned at a certain distance from the rear seat 40. A luggage 80 is placed between the front seat 30 and the rear seat 40.

In this state, when the occupant 50 performs an automatic operation to automatically move the backrest portion 32 to a predetermined position (target position) in the backward direction R, the backrest portion 32 moves in the Q direction by the reclining operation as shown in FIG. 11B (the seat portion 31 does not move). At this time, if the tilt angle of the backrest portion 32 with respect to the seat surface of the seat portion 31 is equal to or greater than a certain value, the backrest portion 32 that is moving hits the luggage 80 as indicated by the dashed line a. As a result, the backrest portion 32 cannot move any further, and the luggage 80 is pinched between the seats 30 and 40. When this pinching is detected, the motor temporarily stops at the pinching position in FIG. 11B and then rotates in reverse. Therefore, the backrest portion 32 is reversed from the pinching position and moves in the Q' direction opposite to the Q direction, as shown in FIG. 11C. As a result, the space between the seats 30 and 40 is widened, and the luggage 80 is recovered from the pinching.

SUMMARY

The above-described operations are performed in a case in which only the seat portion 31 moves in the P direction and pinching occurs (FIGS. 10A to 10C) and in a case in which only the backrest portion 32 moves in the Q direction and pinching occurs (FIGS. 11A to 11C). However, pinching by the seat 30 also occurs when both the seat portion 31 and the backrest portion 32 simultaneously perform a sliding operation and a reclining operation, respectively. In addition, during these operations, the seat portion 31 and the backrest portion 32 do not necessarily move in the same direction, and both the portions may move in opposite directions. Therefore, there are various pinching patterns depending on the modes of the operations of the seat portion and the backrest portion.

An object of one or more embodiments of the present invention is to quickly and accurately recover from various patterns of pinching occurring during the operations of both the seat portion and the backrest portion of the seat.

A seat control device according to one or more embodiments of the present invention is a seat control device configured to control an operation of an electric seat, the electric seat including a seat portion and a backrest portion, the seat control device including: a first control unit configured to control an operation of the seat portion; a second control unit configured to control an operation of the backrest portion; and a pinching detection unit configured to detect pinching of an object caused by the operation of at least one of the seat portion and the backrest portion. In a case in which the pinching detection unit detects pinching during the operations of both the seat portion and the backrest portion, the first control unit performs control to bring the seat portion into a pinching-free state in accordance with a direction of the operation of the seat portion before the pinching occurs. Further, the second control unit performs control to bring the backrest portion into a pinching-free state in accordance with a direction of the operation of the backrest portion before the pinching occurs.

As a first control mode according to one or more embodiments of the present invention, a control mode is conceivable, in which the direction of the operation of the seat portion before the pinching occurs may be a first direction in which pinching is likely to occur and the direction of the operation of the backrest portion before the pinching occurs may be a second direction in which pinching is likely to occur. In this case, the first control unit may perform control such that the seat portion operates in a third direction opposite to the first direction, and the second control unit may perform control such that the backrest portion operates in a fourth direction opposite to the second direction.

As a second control mode according to one or more embodiments of the present invention, a control mode is conceivable, in which the direction of the operation of the seat portion before the pinching occurs may be a third direction opposite to a first direction in which pinching is likely to occur and the direction of the operation of the backrest portion before the pinching occurs may be a second direction in which pinching is likely to occur. In this case, the first control unit may perform control such that the seat portion is stopped, and the second control unit may perform control such that the backrest portion operates in a fourth direction opposite to the second direction.

In this second control mode, the first control unit may perform control such that the seat portion continues to operate in the third direction instead of stopping the seat portion.

As a third control mode according to one or more embodiments of the present invention, a control mode is conceivable, in which the direction of the operation of the seat portion before the pinching occurs may be a first direction in which pinching is likely to occur and the direction of the operation of the backrest portion before the pinching occurs may be a fourth direction opposite to a second direction in which pinching is likely to occur. In this case, the first control unit may perform control such that the seat portion operates in a third direction opposite to the first direction, and the second control unit may perform control such that the backrest portion is stopped.

In this third control mode, the second control unit may perform control such that the backrest portion continues to operate in the fourth direction instead of stopping the backrest portion.

According to one or more embodiments of the present invention, even if various patterns of pinching occur during the operations of both the seat portion and the backrest portion of the seat, it is possible to deal with such pinching and recover from the pinching quickly and accurately.

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention. Embodiments of the present invention will be described with reference to drawings. The same reference numerals are used throughout the drawings to refer to the same or corresponding parts. In the following, an example in which a seat control device mounted on a vehicle will be given.

Figure 1:
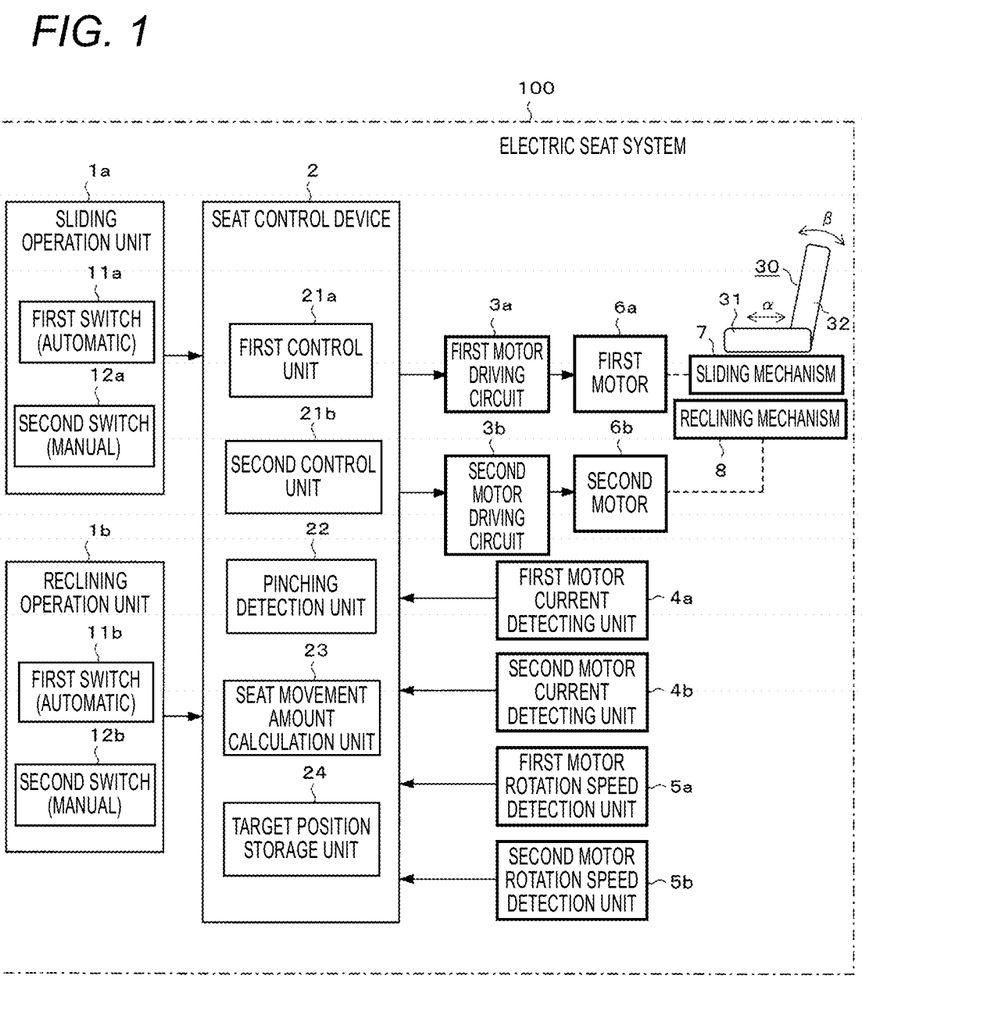
FIG. 1 is a block diagram of an electric seat system including a seat control device of one or more embodiments of the present invention.

FIG. 1 shows an example of a seat control device 2 according to one or more embodiments of the present invention and an electric seat system 100 using the same. The electric seat system 100 is installed in a vehicle such as a four-wheeled motor vehicle. The electric seat system 100 includes a sliding operation unit 1a, a reclining operation unit 1b, a seat control device 2, a first motor driving circuit 3a, a second motor driving circuit 3b, a first motor current detecting unit 4a, a second motor current detecting unit 4b, a first motor rotation speed detection unit 5a, a second motor rotation speed detection unit 5b, a first motor 6a, a second motor 6b, a sliding mechanism 7, a reclining mechanism 8, and a seat 30. The seat 30 is an electric seat driven by the motors 6a and 6b.

The sliding operation unit 1a is provided with two switches 11a and 12a. The first switch 11a is an automatic drive switch that is operated when the seat portion 31 of the seat 30 is automatically slid to a target position in a α direction. The second switch 12a is a manual drive switch that is operated when the seat portion 31 is manually slid to an arbitrary position in the α direction.

The reclining operation unit 1b is also provided with two switches 11b and 12b. The first switch 11b is an automatic drive switch that is operated when the backrest portion 32 of the seat 30 is automatically reclined to a target position in a β direction. The second switch 12b is a manual drive switch that is operated when the backrest portion 32 is manually reclined to an arbitrary position in the β direction.

The seat control device 2 includes a first control unit 21a, a second control unit 21b, a pinching detection unit 22, a seat movement amount calculation unit 23, and a target position storage unit 24.

The first control unit 21a outputs a control signal for controlling the rotation of the first motor 6a to the first motor driving circuit 3a based on the operation state of each of the switches 11a and 12a of the sliding operation unit 1a, the detection result of the pinching detection unit 22, and the movement amount of the seat portion 31 calculated by the seat movement amount calculation unit 23, and the like.

The second control unit 21b outputs a control signal for controlling the rotation of the second motor 6b to the second motor driving circuit 3b based on the operation state of each of the switches 11b and 12b of the reclining operation unit 1b, the detection result of the pinching detection unit 22, and the movement amount of the backrest portion 32 calculated by the seat movement amount calculation unit 23, and the like.

The pinching detection unit 22 detects pinching of an object by the seat 30 based on the currents of the second motors 6a and 6b detected by the current detecting units 4a and 4b, respectively. The details of pinching detection based on the motor current are well known and will not be described.

The seat movement amount calculation unit 23 calculates the respective movement amounts of the seat portion 31 and the backrest portion 32 based on the rotation speeds of the motors 6a and 6b respectively detected by the motor rotation speed detection units 5a and 5b. The movement amount of the seat portion 31 is a distance, and the movement amount of the backrest portion 32 is an angle. The motor rotation speed detection units 5a and 5b are composed of, for example, rotation sensors that output pulse signals in synchronization with the rotation of the motors 6a and 6b.

The target position storage unit 24 stores target positions when the seat 30 is automatically driven by the first switches 11a and 11b of the operation units 1a and 1b. After adjusting the positions of the seat portion 31 and the backrest portion 32 to desired positions by operating the second switches 12a and 12b of the respective operation units 1a and 1b, the positions are stored in the target position storage unit 24 as target positions by operating a setting switch not shown in the drawing.

The seat control device 2 is composed of a microcomputer, and respective functions of the first control unit 21a, the second control unit 21b, the pinching detection unit 22, and the seat movement amount calculation unit 23 are actually realized by software, but in this case, the functions are illustrated as blocks of hardware for convenience.

The first motor driving circuit 3a generates a drive voltage for rotating the first motor 6a and supplies the drive voltage to the first motor 6a. The first motor 6a is rotated by this drive voltage, and causes the seat portion 31 of the seat 30 to slide in the α direction via the sliding mechanism 7. The sliding mechanism 7 is connected to the first motor 6a and the seat portion 31, and converts the rotary motion of the first motor 6a into linear motion.

The second motor driving circuit 3b generates a drive voltage for rotating the second motor 6b and supplies the drive voltage to the second motor 6b. The second motor 6b is rotated by this drive voltage, and causes the backrest portion 32 of the seat 30 to recline in the direction via the reclining mechanism 8. The reclining mechanism 8 is connected to the second motor 6b and the backrest portion 32, and transmits the rotation of the second motor 6b to the backrest portion 32 via gears or the like.

Next, the operation in a case in which pinching occurs caused by the seat portion 31 and the backrest portion 32 of the seat 30 will be described. The operation in a case in which pinching has occurred while only the seat portion 31 is moving is the same as the operation described with reference to FIGS. 10A to 10C. Further, the operation in a case in which pinching has occurred while only the backrest portion 32 is moving is the same as the operation described with reference to FIGS. 11A to 11C.

FIGS. 2A to 4C show the operations in a case in which pinching has occurred while both the seat portion 31 and the backrest portion 32 are moving. These operations will be described in detail below.

Figure 2A:
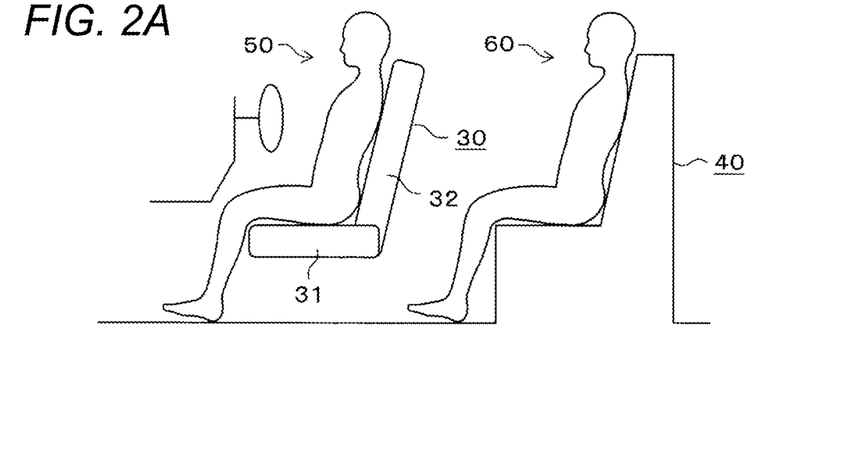
FIGS. 2A to 2C are diagrams showing an operation (first control mode) when pinching occurs.
Figure 2B:
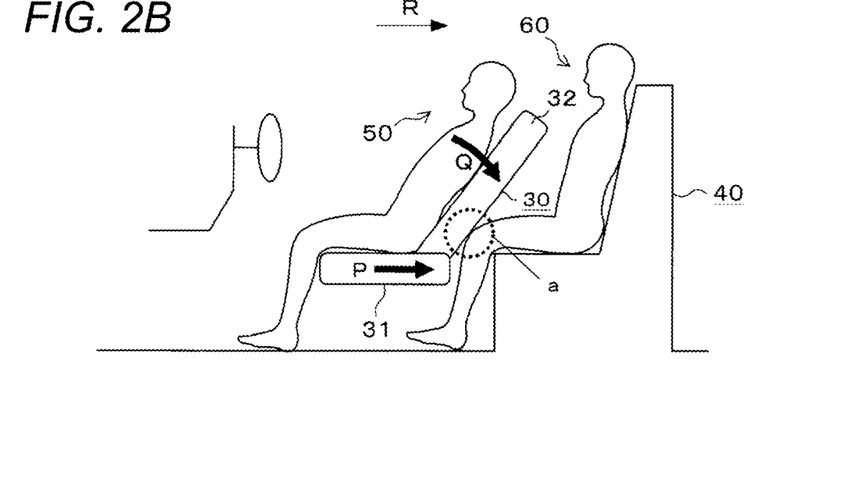

FIGS. 2A to 2C show the operation in accordance with the first control mode described above. In the first control mode, the seat portion 31 and the backrest portion 32 operate in the same direction to cause pinching. FIG. 2A shows the state before operation (that is, the state before pinching occurs), in which the front seat 30 is positioned at a certain distance from the rear seat 40. In this state, when the first switch 11a of the sliding operation unit 1a and the first switch 11b of the reclining operation unit 1b are operated, the seat portion 31 moves in the P direction toward the target position by the sliding operation, and the backrest portion 32 moves in the Q direction toward the target position by the reclining operation as shown in FIG. 2B. Then, the legs of the occupant 60 on the rear seat are pinched between the seats 30 and 40 as indicated by the dashed line a.

When this pinching is detected by the pinching detection unit 22, the first control unit 21a outputs a stop command signal to the first motor driving circuit 3a to temporarily stop the first motor 6a for sliding operation. The second control unit 21b also outputs a stop command signal to the second motor driving circuit 3b to temporarily stop the second motor 6b for reclining operation. As a result, the seat portion 31 and the backrest portion 32 are temporarily stopped at the position shown in FIG. 2B.

Figure 2C:
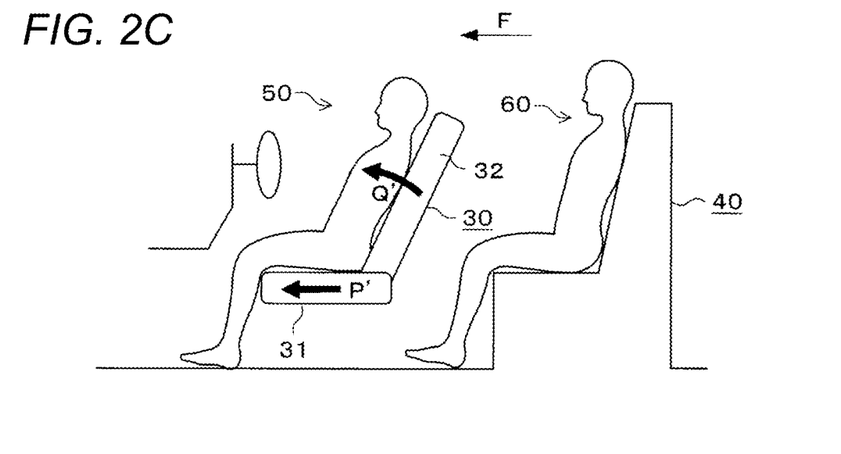

Thereafter, the first control unit 21a outputs a reverse rotation command signal to the first motor driving circuit 3a to rotate the first motor 6a in reverse. The second control unit 21b also outputs a reverse rotation command signal to the second motor driving circuit 3b to rotate the second motor 6b in reverse. Therefore, the seat portion 31 and the backrest portion 32 are reversed from the position shown in FIG. 2B, the seat portion 31 moves in the P' direction opposite to the P direction, and the backrest portion 32 moves in the Q' direction opposite to the Q direction as shown in FIG. 2C. As a result, the space between the seats 30 and 40 is widened, and the legs of the occupant 60 are recovered from the pinching.

The P direction in which the seat portion 31 moves and the Q direction in which the backrest portion 32 moves shown in FIG. 2A to 2C are the directions are the movement directions in which pinching is likely to occur in a case in which the occupant 60 is seated on the rear seat 40, or in a case in which the luggage 70 is placed between the front seat 30 and the rear seat 40 as shown FIGS. 4A to 4C described below. The P direction and Q direction respectively correspond to the "first direction" and the "second direction" in one or more embodiments of the present invention. The P' direction and the Q' direction are directions for recovering from pinching, and respectively correspond to the "third direction" and the "fourth direction" in one or more embodiments of the present invention. The same applies to FIGS. 3A to 3C and 4A to 4C below.

Figure 3A:
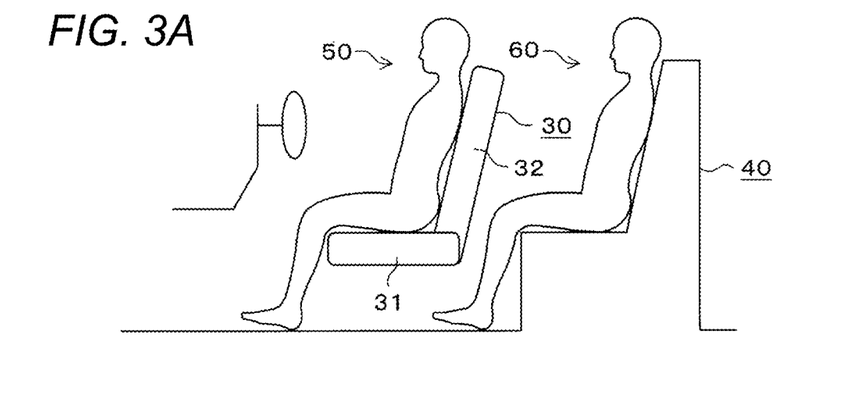
FIGS. 3A to 3C are diagrams showings an operation (second control mode) when pinching occurs.
Figure 3B:
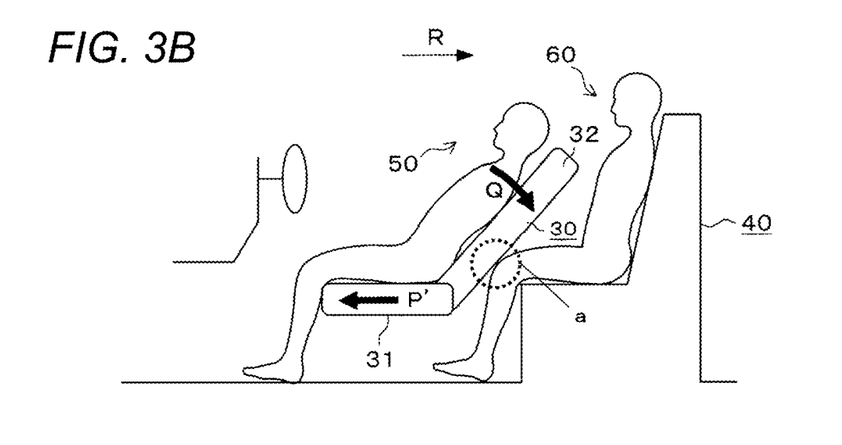

FIGS. 3A to 3C show the operation in accordance with the second control mode described above. In the second control mode, the seat portion 31 and the backrest portion 32 move in different directions to cause pinching. FIG. 3A shows a state before operation, in which the front seat 30 is relatively close to the rear seat 40. In this state, when the first switch 11a of the sliding operation unit 1a and the first switch 11b of the reclining operation unit 1b are operated, the seat portion 31 moves in the P' direction toward the target position by the sliding operation, and the backrest portion 32 moves in the Q direction toward the target position by the reclining operation as shown in FIG. 3B. That is, the seat portion 31 and the backrest portion 32 move in opposite directions.

In this case, since the seat portion 31 moves in the direction P' direction, no pinching occurs, but since the backrest portion 32 moves in the Q direction, when the tilt angle of the backrest portion 32 increases, the legs of the occupant 60 on the rear seat is pinched between the backrest portion 32 and the seat 40 as shown by the dashed line a.

When this pinching is detected by the pinching detection unit 22, the first control unit 21a outputs a stop command signal to the first motor driving circuit 3a to stop the first motor 6a. The second control unit 21b also outputs a stop command signal to the second motor driving circuit 3b to temporarily stop the second motor 6b. As a result, the seat portion 31 and the backrest portion 32 are stopped at the positions shown in FIG. 3B.

Figure 3C:
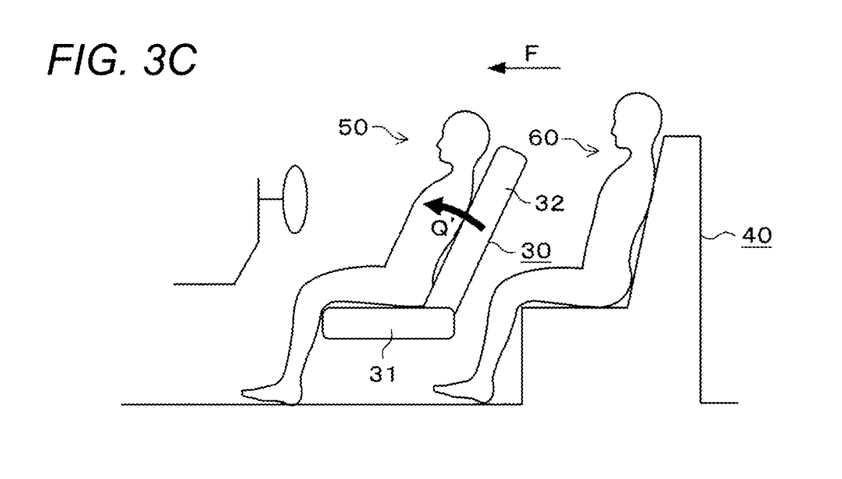

Thereafter, the first control unit 21a continues to output the stop command signal to the first motor driving circuit 3a to keep the first motor 6a stopped. On the other hand, the second control unit 21b outputs a reverse rotation command signal to the second motor driving circuit 3b to rotate the second motor 6b in reverse. As a result, as shown in FIG. 3C, the seat portion 31 does not move from the position of FIG. 3B, but the backrest portion 32 is reversed from the position in FIG. 3B and moves in the Q' direction opposite to the Q direction. As a result, the space between the backrest portion 32 and the seat 40 is widened, and the legs of the occupant 60 are recovered from the pinching.

Figure 4A:
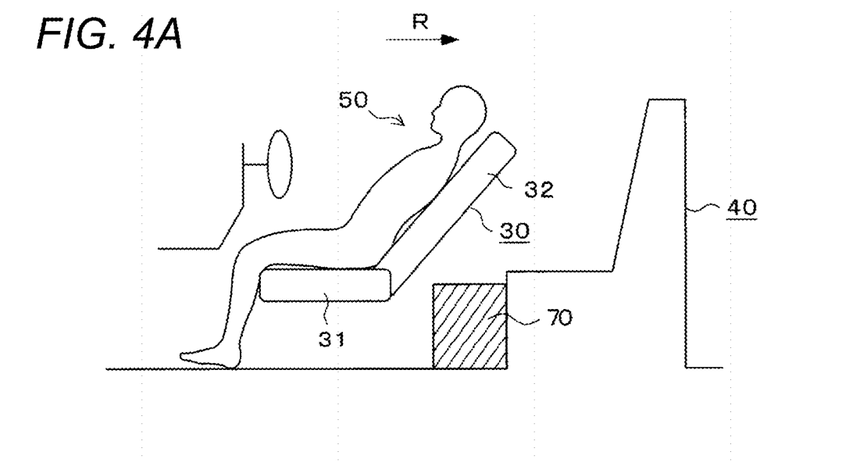
FIGS. 4A to 4C are diagrams showing an operation (third control mode) when pinching occurs.
Figure 4B:
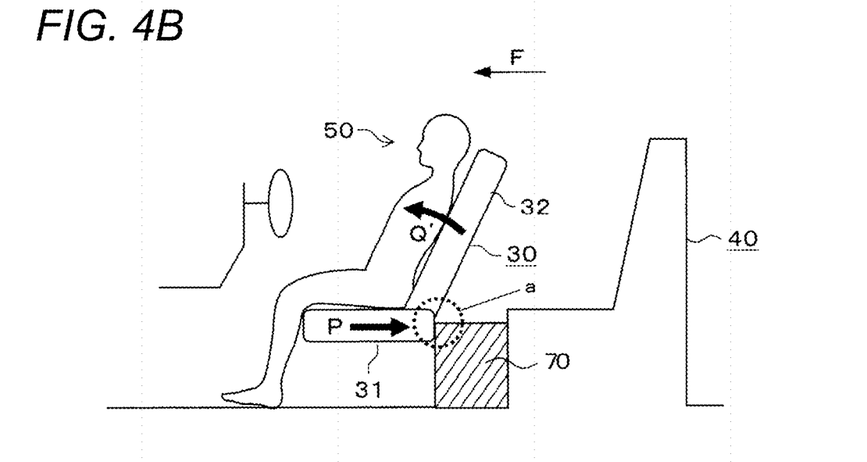
Figure 4C:
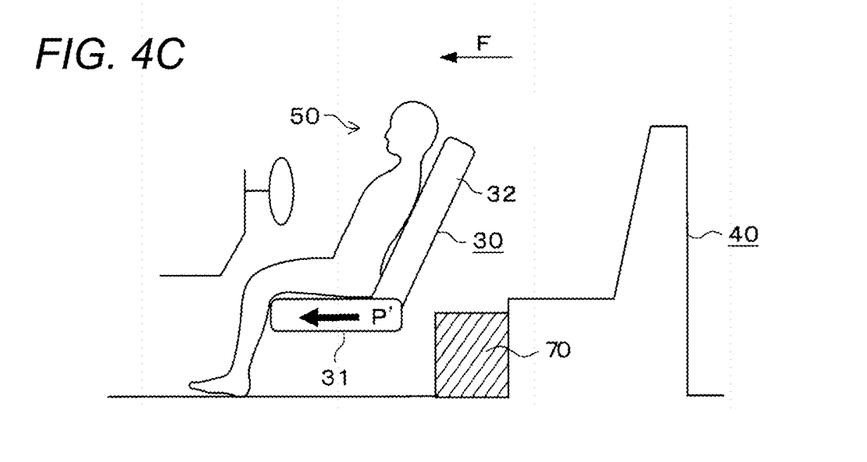

FIGS. 4A to 4C show the operation in accordance with the third control mode described above. In the third control mode, as in the second control mode, the seat portion 31 and the backrest portion 32 operate in different directions to cause pinching, but the respective operation directions are opposite to those in the second control mode.

FIG. 4A shows a state before operation, in which the backrest portion 32 of the seat 30 is relatively close to the rear seat 40. The luggage 70 is placed between the seat 30 and the seat 40. In this state, when the first switch 11a of the sliding operation unit 1a and the first switch 11b of the reclining operation unit 1b are operated, the seat portion 31 moves in the P direction toward the target position by the sliding operation, and the backrest portion 32 moves in the Q' direction toward the target position by the reclining operation as shown in FIG. 4B. That is, the seat portion 31 and the backrest portion 32 move in directions opposite to each other (each movement direction is opposite to that in FIGS. 3A to 3C). In this case, since the backrest portion 32 moves in the Q' direction, pinching does not occur, but since the seat portion 31 moves in the P direction, when the movement amount increases, the luggage 70 is pinched between the seat portion 31 and the seat 40 as shown by the dashed line a.

When this pinching is detected by the pinching detection unit 22, the first control unit 21a outputs a stop command signal to the first motor driving circuit 3a to temporarily stop the first motor 6a. On the other hand, the second control unit 21b also outputs a stop command signal to the second motor driving circuit 3b to stop the second motor 6b. As a result, the seat portion 31 and the backrest portion 32 are stopped at the positions shown in FIG. 4B.

Thereafter, the first control unit 21a outputs a reverse rotation command signal to the first motor driving circuit 3a to rotate the first motor 6a in reverse. On the other hand, the second control unit 21b continues to output the stop command signal to the second motor driving circuit 3b to keep the second motor 6b stopped. As a result, as shown in FIG. 4C, the backrest portion 32 does not move from the position in FIG. 4B, but the seat portion 31 is reversed from the position in FIG. 4B and moves in the P' direction opposite to the P direction. As a result, the space between the seat portion 31 and the seat 40 is widened, and the luggage 70 is recovered from the pinching.

As described above, in the present embodiment, in a case in which pinching is detected during the operations of both the seat portion 31 and the backrest portion 32, the first control unit 21a controls (reverses or stops) to bring the seat portion 31 into a pinching-free state in accordance with the operation direction (P or P') of the seat portion 31 before pinching occurs, and the second control unit 21b controls (reverses or stops) to bring the backrest portion 32 into a pinching-free state in accordance with the operation direction (Q or Q') of the backrest portion 32 before the pinching occurs. Therefore, according to one or more embodiments of the present invention, it is possible to cope with various patterns of pinching occurring. A specific description will be given below.

Figure 5:
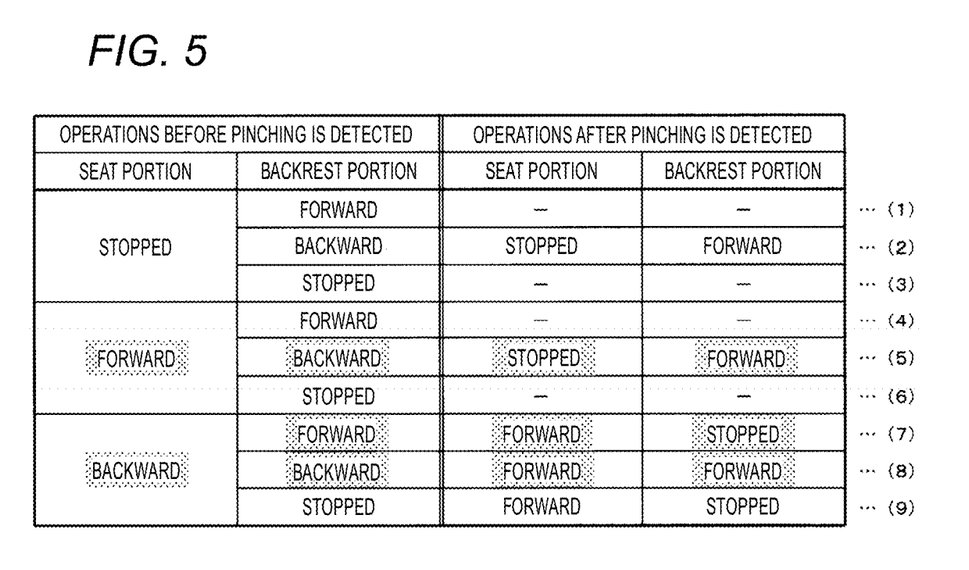
FIG. 5 is a table showing the operations of a seat portion and a backrest portion.

FIG. 5 is a table showing how the seat portion 31 and the backrest portion 32 are to be operated after pinching is detected with respect to the operation states of the seat portion 31 and the backrest portion 32 before pinching is detected.

In the case of (1) in FIG. 5, since the seat portion 31 is stopped and the backrest portion 32 is moving forward (in the Q' direction), no pinching occurs. In the case of (3), since both the seat portion 31 and the backrest portion 32 are stopped, naturally no pinching occurs. In the case of (4), since both the seat portion 31 and the backrest portion 32 are moving forward (P' direction, Q' direction), no pinching occurs. In the case of (6), since the seat portion 31 is moving forward (in the direction of P') and the backrest portion 32 is stopped, no pinching occurs.

Pinching occurs in the following cases (2), (5), (7), (8), and (9). Among these cases, (2) and (9) are related-art control modes, and (5), (7), and (8) are control modes unique to one or more embodiments of the present invention.

In the case of (2) in FIG. 5, the seat portion 31 is stopped before pinching is detected, but the backrest portion 32 is moving backward (in the Q direction) to cause pinching. After pinching is detected, the seat portion 31 remains stopped and the backrest portion 32 moves forward (in the Q' direction) to recover from the pinching. The operation in this case is the same as the operation described with reference to FIGS. 11A to 11C.

In the case of (9) in FIG. 5, the backrest portion 32 is stopped before pinching is detected, but the seat portion 31 is moving backward (in the P direction) to cause pinching. After pinching is detected, the backrest portion 32 remains stopped and the seat portion 31 moves forward (in the P' direction) to recover from the pinching. The operation in this case is the same as the operation described with reference to FIGS. 10A to 10C.

In the case of (5) in FIG. 5, the seat portion 31 is moving forward (in the direction of P') before pinching is detected, but the backrest portion 32 is moving backward (in the Q direction) to cause pinching. After pinching is detected, the seat portion 31 stops and the backrest portion 32 moves forward (in the Q' direction) to recover from the pinching. The operation in this case is the operation of the second control mode described with reference to FIGS. 3A to 3C.

In the case of (7) in FIG. 5, the backrest portion 32 moves forward (in the Q' direction) before pinching is detected, but the seat portion 31 is moving backward (in the P direction) to cause pinching. After pinching is detected, the seat portion 31 moves forward (in the P' direction) and the backrest portion 32 is stopped to recover from the pinching. The operation in this case is the operation of the third control mode described with reference to FIGS. 4A to 4C.

In the case of (8) in FIG. 5, before pinching is detected, the seat portion 31 is moving backward (in the P direction) and the backrest portion 32 is also moving backward (in the Q direction) to cause pinching. After pinching is detected, the seat portion 31 moves forward (in the P' direction) and the backrest portion 32 also moves forward (in the Q' direction) to recover from the pinching. The operation in this case is the operation of the first control mode described with reference to FIGS. 2A to 2C.

In this manner, according to one or more embodiments of the present invention, it is possible to quickly and accurately recover from not only the pinching shown in FIGS. 10A to 10C and FIGS. 11A to 11C but also the pinching shown in FIGS. 2A to 4C in accordance with the mode of the operations of the seat portion 31 and the backrest portion 32.

Figure 6:
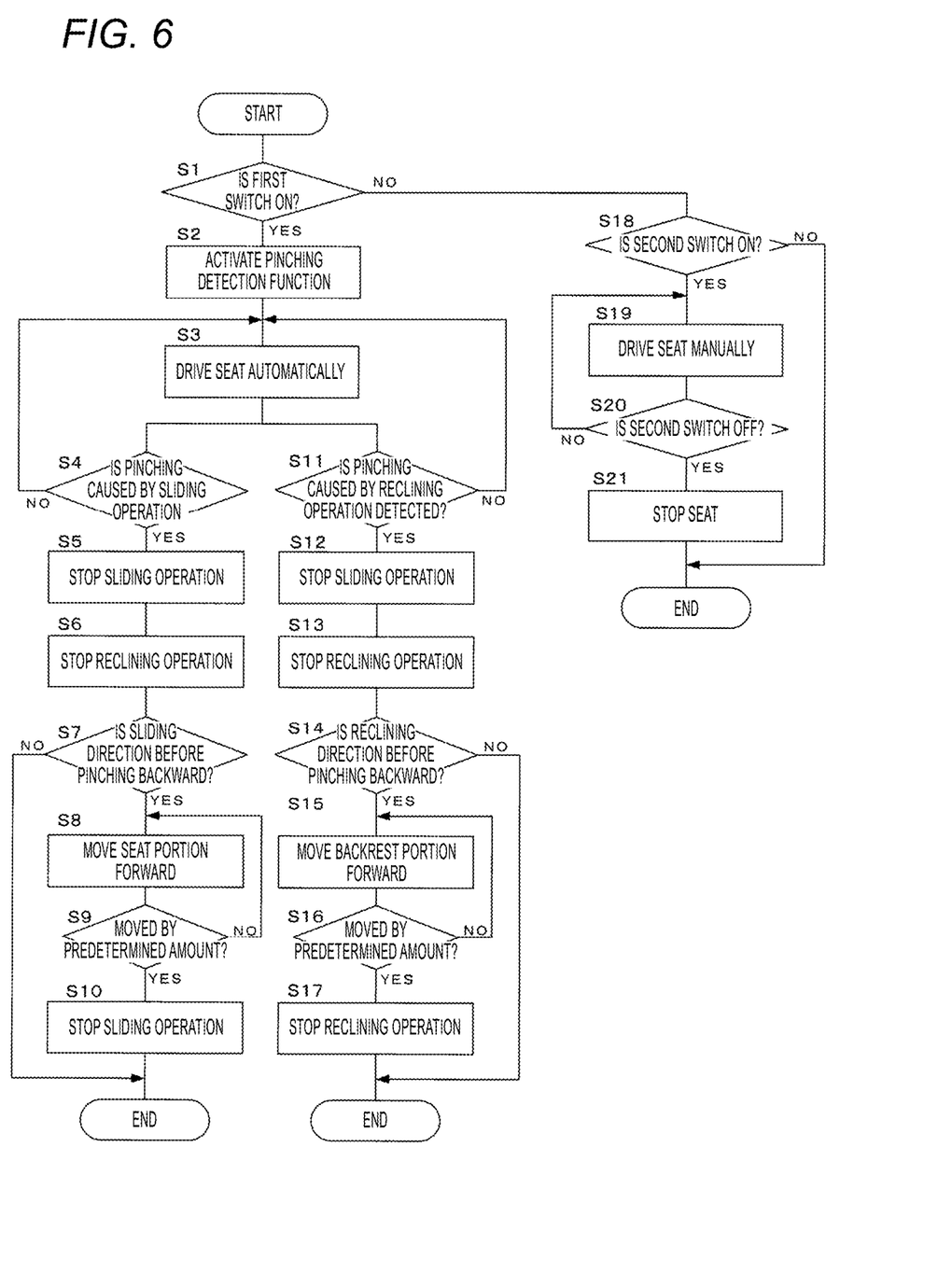
FIG. 6 is a flow chart showing a control procedure in the seat control device.

FIG. 6 is a flow chart showing a control procedure in the seat control device 2 of FIG. 1. When the first switches 11a and 11b are operated in step S1, the pinching detection function of the pinching detection unit 22 is activated in step S2. In the subsequent step S3, the motor driving circuits 3a and 3b are operated under the control of the control units 21a and 21b to rotate the motors 6a and 6b, and automatic driving of the seat 30 is started. Thereafter, steps S4 to S10 and steps S11 to S17 are executed in parallel.

In step S4, when the pinching detection unit 22 detects pinching caused by the sliding operation of the seat portion 31, the sliding operation of the seat portion 31 is stopped in step S5, and the reclining operation of the backrest portion 32 is stopped in step S6. Thereafter, in step S7, it is determined whether or not the direction of the operation (sliding direction) of the seat portion 31 before pinching occurs is the backward direction (P direction), and if it is determined that the direction of the operation is the backward direction, the seat portion 31 is moved forward (in the P' direction) in step S8. Then, when the seat portion 31 is moved by a predetermined amount in step S9, the sliding operation of the seat portion 31 is stopped in step S10.

On the other hand, when pinching caused by the reclining operation of the backrest portion 32 is detected by the pinching detection unit 22 in step S11, the sliding operation of the seat portion 31 is stopped in step S12, and the reclining operation of the backrest portion 32 is stopped in step S13. Thereafter, in step S14, it is determined whether or not the direction of the operation (reclining direction) of the backrest portion 32 before pinching occurs is the backward direction (Q direction), and if it is determined that the direction of the operation is the backward direction, the backrest portion 32 is moved forward (in the Q' direction) in step S15. Then, when the backrest portion 32 is moved by a predetermined amount in step S16, the reclining operation of the backrest portion 32 is stopped in step S17.

In a case in which the second switches 12a and 12b are operated in step S18, the motor driving circuits 3a and 3b operate to rotate the motors 6a and 6b under the control of the control units 21a and 21b in step S19, and the manual driving of the seat 30 is started. When the operations of the second switches 12a and 12b are canceled in step S20, the motors 6a and 6b are stopped in step S21, and the seat 30 is stopped. That is, the sliding operation of the seat portion 31 and the reclining operation of the backrest portion 32 are performed only while the second switches 12a and 12b are being operated.

In one or more embodiments of the present invention, various embodiments as described below can be adopted in addition to the embodiments described above.

Figure 7A:
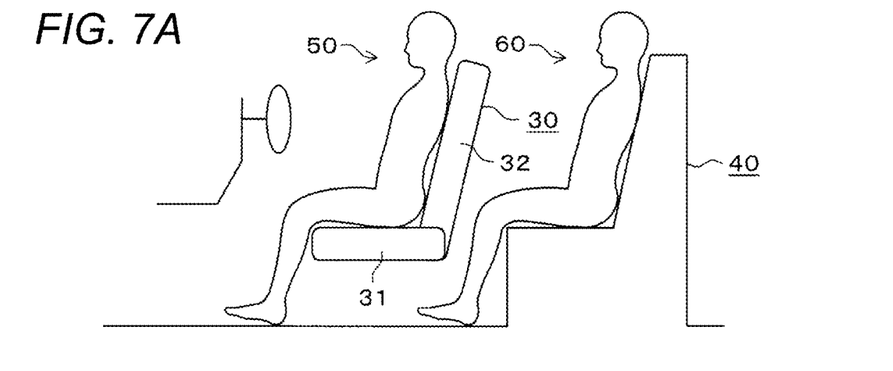
FIGS. 7A to 7C are diagrams showing an example of another operation in the second control mode.
Figure 7B:
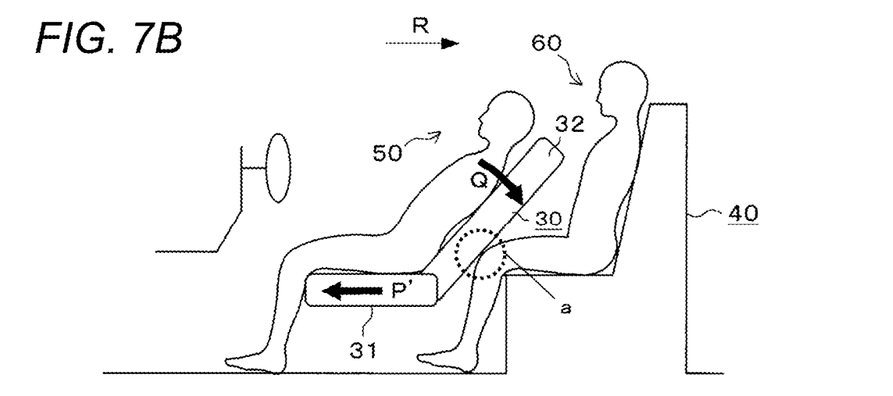
Figure 7C:
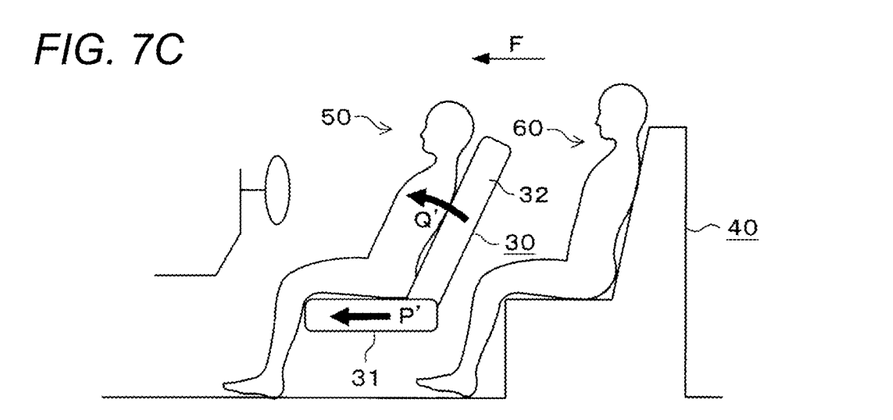
Figure 9:
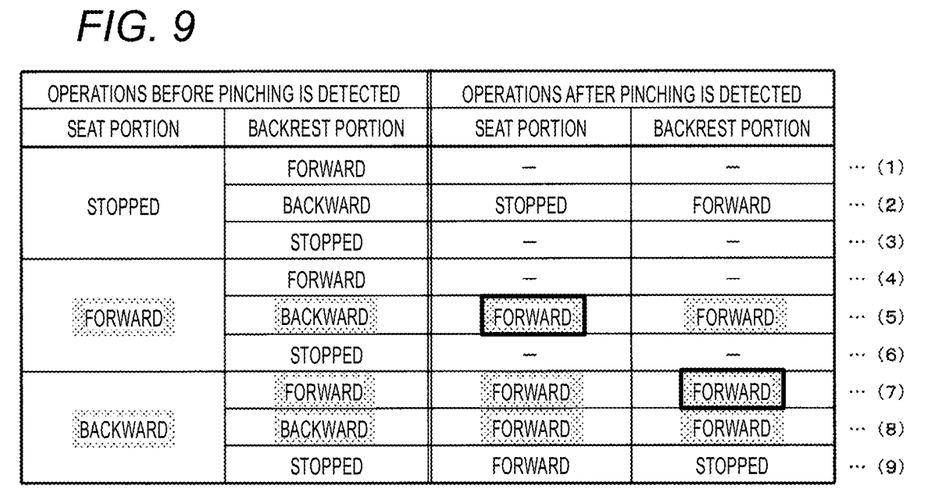
FIG. 9 is a table showing an example of other operations of the seat portion and the backrest portion.

In the above-described embodiment, in FIGS. 3A to 3C, the seat portion 31 is controlled to be stopped in a case in which pinching has occurred caused by the backrest portion 32, but instead, the seat portion 31 may be controlled to continue to slide in the P' direction (forward) as shown in FIG. 7C. This is because the movement in the P' direction does not cause pinching with the seat 40. In one or more embodiments of the present invention, the "control to bring the seat portion into a pinching-free state" includes such continuation of the operation of the seat portion 31 in the P' direction. The operation in the case of FIGS. 7A to 7C is as shown in (5) in the table of FIG. 9.

Figure 8A:
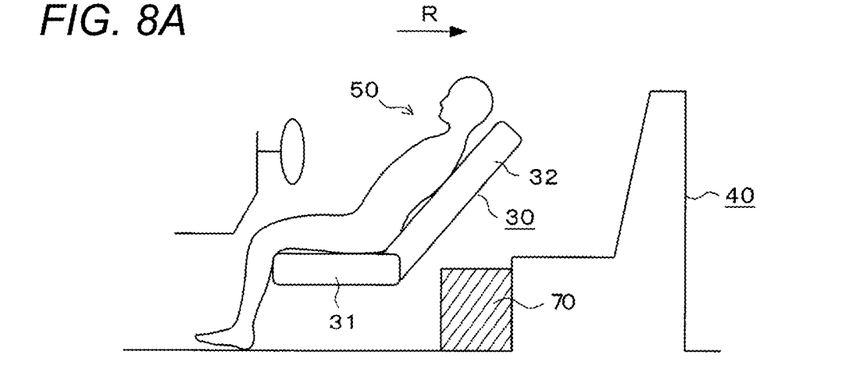
FIGS. 8A to 8C are diagrams showing an example of another operation in the third control mode.
Figure 8B:
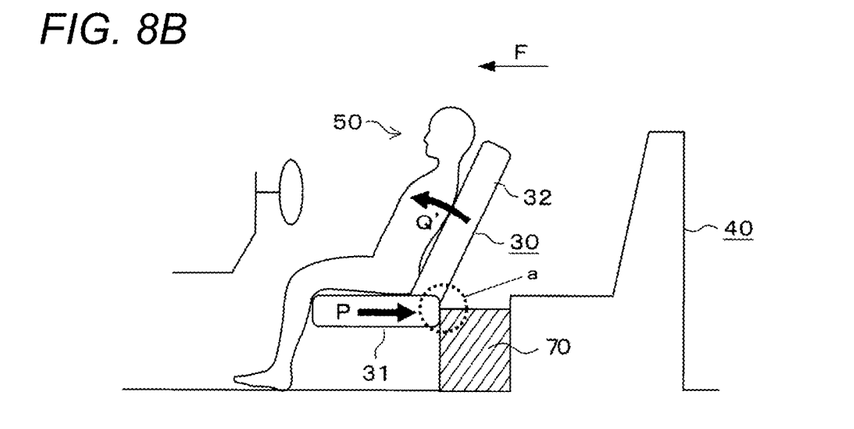
Figure 8C:
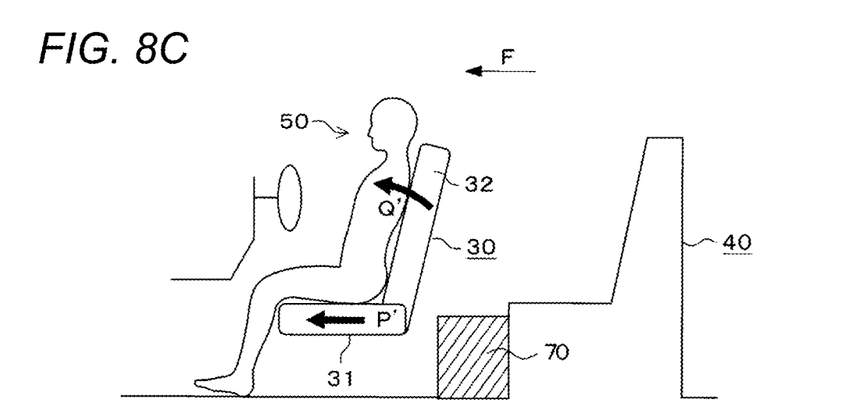

Similarly, in the above-described embodiment, in FIGS. 4A to 4C, in a case in which pinching has occurred caused by the seat portion 31, the backrest portion 32 is controlled to be stopped, but instead, the backrest portion 32 may be controlled to continue to recline in the Q' direction (forward) as shown in FIG. 8C. This is because movement in the Q' direction also does not cause pinching with the seat 40. In one or more embodiments of the present invention, the "control to bring the backrest portion into a pinching-free state" includes such continuation of the operation of the backrest portion 32 in the Q' direction. The operation in the case of FIGS. 8A to 8C is as shown in (7) in the table of FIG. 9.

In the above embodiment, pinching is detected based on the motor current detected by the motor current detecting units 4a and 4b, but instead, pinching may be detected based on the rotation speed of the motors 6a and 6b detected by the motor rotation speed detection units 5a and 5b.

In the embodiment described above, in FIG. 1, the motor driving circuits 3a and 3b are provided outside the seat control device 2, but these motor driving circuits 3a and 3b may be included in the seat control device 2. The seat control device 2 may also include the motor current detecting units 4a and 4b and the motor rotation speed detection units 5a and 5b.

In the above-described embodiments, the seat control device mounted on the vehicle is taken as an example, but the present invention can also be applied to seat control devices used in fields other than vehicles.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. A seat control device configured to control an operation of an electric seat, the electric seat comprising a seat portion and a backrest portion, the seat control device comprising:
   a first control unit configured to control an operation of the seat portion;
   a second control unit configured to control an operation of the backrest portion; and
   a pinching detection unit configured to detect pinching of an object caused by an operation of one of the seat portion and the backrest portion,
   wherein in response to the pinching detection unit detecting pinching during operations of one of the seat portion and the backrest portion which are not operated simultaneously,
      the first control unit performs control to bring the seat portion into a pinching-free state in accordance with a direction of the operation of the seat portion before the pinching occurs, and
      the second control unit performs control to bring the backrest portion into a pinching-free state in accordance with a direction of the operation of the backrest portion before the pinching occurs, and
   wherein in response to the direction of the operation of the seat portion before the pinching occurs being a third direction opposite to a first direction in which pinching is likely to occur and the direction of the operation of the backrest portion before the pinching occurs being a second direction in which pinching is likely to occur,
      the first control unit performs control such that the seat portion is stopped, and
      the second control unit performs control such that the backrest portion operates in a fourth direction opposite to the second direction.

2. The seat control device according to claim 1,
   wherein in response to the direction of the operation of the seat portion before the pinching occurs being a first direction in which pinching is likely to occur and the direction of the operation of the backrest portion before the pinching occurs being a second direction in which pinching is likely to occur,
      the first control unit performs control such that the seat portion operates in the third direction opposite to the first direction, and
      the second control unit performs control such that the backrest portion operates in the fourth direction opposite to the second direction.

3. The seat control device according to claim 1,
   wherein in response to the direction of the operation of the seat portion before the pinching occurs being a first direction in which pinching is likely to occur and the direction of the operation of the backrest portion before the pinching occurs being the fourth direction opposite to a second direction in which pinching is likely to occur,
      the first control unit performs control such that the seat portion operates in the third direction opposite to the first direction, and
      the second control unit performs control such that the backrest portion is stopped.

4. A seat control device configured to control an operation of an electric seat, the electric seat comprising a seat portion and a backrest portion, the seat control device comprising:
   a first control unit configured to control an operation of the seat portion;
   a second control unit configured to control an operation of the backrest portion; and
   a pinching detection unit configured to detect pinching of an object caused by an operation of one of the seat portion and the backrest portion,
   wherein in response to the pinching detection unit detecting pinching during operations of one of the seat portion and the backrest portion which are not operated simultaneously,
      the first control unit performs control to bring the seat portion into a pinching-free state in accordance with a direction of the operation of the seat portion before the pinching occurs, and
      the second control unit performs control to bring the backrest portion into a pinching-free state in accordance with a direction of the operation of the backrest portion before the pinching occurs, and
   wherein in response to the direction of the operation of the seat portion before the pinching occurs being a third direction opposite to a first direction in which pinching is likely to occur and the direction of the operation of the backrest portion before the pinching occurs being a second direction in which pinching is likely to occur,
      the first control unit performs control such that the seat portion continues to operate in the third direction, and
      the second control unit performs control such that the backrest portion operates in a fourth direction opposite to the second direction.

5. The seat control device according to claim 4,
   wherein in response to the direction of the operation of the seat portion before the pinching occurs being a first direction in which pinching is likely to occur and the direction of the operation of the backrest portion before the pinching occurs being the fourth direction opposite to a second direction in which pinching is likely to occur,
      the first control unit performs control such that the seat portion operates in thea third direction opposite to the first direction, and
      the second control unit performs control such that the backrest portion continues to operate in the fourth direction.

6. A seat control method for controlling an operation of an electric seat, the electric seat comprising a seat portion and a backrest portion, the seat control method comprising:
   detecting pinching of an object during operations of one of the seat portion and the backrest portion which are not operated simultaneously;
   performing control to bring the seat portion into a pinching-free state in accordance with a direction of the operation of the seat portion before the pinching occurs in response to the pinching being detected;
   performing control to bring the backrest portion into a pinching-free state in accordance with a direction of the operation of the backrest portion before the pinching occurs in response to the pinching being detected; and
   performing control such that the seat portion continues to operate in a third direction and performing control such that the backrest portion operates in a fourth direction opposite to the second direction, in response to determining the direction of the operation of the seat portion before the pinching occurs being the third direction opposite to a first direction in which pinching is likely to occur and the direction of the operation of the backrest portion before the pinching occurs being a second direction in which pinching is likely to occur.

7. The seat control method according to claim 6, further comprising:

in response to the direction of the operation of the seat portion before the pinching occurs being a first direction in which pinching is likely to occur and the direction of the operation of the backrest portion before the pinching occurs being a second direction in which pinching is likely to occur, performing control such that the seat portion operates in the third direction opposite to the first direction, and performing control such that the backrest portion operates in the fourth direction opposite to the second direction.

* * * * *